US006176343B1

United States Patent
Vincent et al.

(10) Patent No.: US 6,176,343 B1
(45) Date of Patent: *Jan. 23, 2001

(54) VEHICLE STEERING APPARATUS

(75) Inventors: Richard A. Vincent, Kingsport; Bobby Joe Adams, Jr., Surgionsville; Mark A. Skelton, Mt. Carmel; Michael Lewis Nicholson, Morristown, all of TN (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/990,339

(22) Filed: Dec. 15, 1997

(51) Int. Cl.⁷ ........................................................ B62D 5/06
(52) U.S. Cl. ......................... 180/428; 180/417; 92/168; 277/584
(58) Field of Search .................................... 180/428, 417, 180/426, 427, 439; 92/136, 168; 277/572, 573, 577, 584

(56) References Cited

U.S. PATENT DOCUMENTS

| | | |
|---|---|---|
| 4,211,152 | 7/1980 | Colletti et al. . |
| 4,276,812 | 7/1981 | Dymond . |
| 4,418,781 | 12/1983 | Rabe et al. . |
| 4,608,876 | 9/1986 | Rosell . |
| 4,629,026 | 12/1986 | Rosell . |
| 4,788,877 | 12/1988 | Robinson et al. . |
| 4,809,806 | 3/1989 | Pietrzak et al. . |
| 4,940,104 | * 7/1990 | Hasegawa ............................ 180/428 |
| 5,181,581 | 1/1993 | Engler . |
| 5,213,174 | 5/1993 | Adams . |
| 5,213,175 | 5/1993 | Feindel . |
| 5,285,864 | 2/1994 | Martin et al. . |
| 5,505,276 | * 4/1996 | Luibrand .............................. 180/428 |
| 5,730,244 | * 3/1998 | Engler et al. ........................ 180/417 |

FOREIGN PATENT DOCUMENTS

| | | |
|---|---|---|
| 56-18272 | 7/1954 | (JP) . |
| 55-68473 | 5/1980 | (JP) . |
| 3-73265 | 7/1991 | (JP) . |

* cited by examiner

Primary Examiner—Christopher P. Schwartz
Assistant Examiner—Pamela J. Lipka
(74) Attorney, Agent, or Firm—Tarolli, Sundheim, Covell, Tummino & Szabo L.L.P.

(57) ABSTRACT

A steering gear housing part (112) has a tubular portion (184) with an annular inner end surface (188). The housing part (112) is constructed with reference to a corresponding hydraulic fluid power cylinder (114) so as to be receivable in an installed position in which the tubular portion (184) extends inward through an open end (182) of the power cylinder (114) in an interference fit with the power cylinder (114). When the housing part (112) is in its installed position, the inner end surface (188) of the tubular portion (184) abuts an annular hydraulic fluid seal (162) in the power cylinder (114).

6 Claims, 3 Drawing Sheets

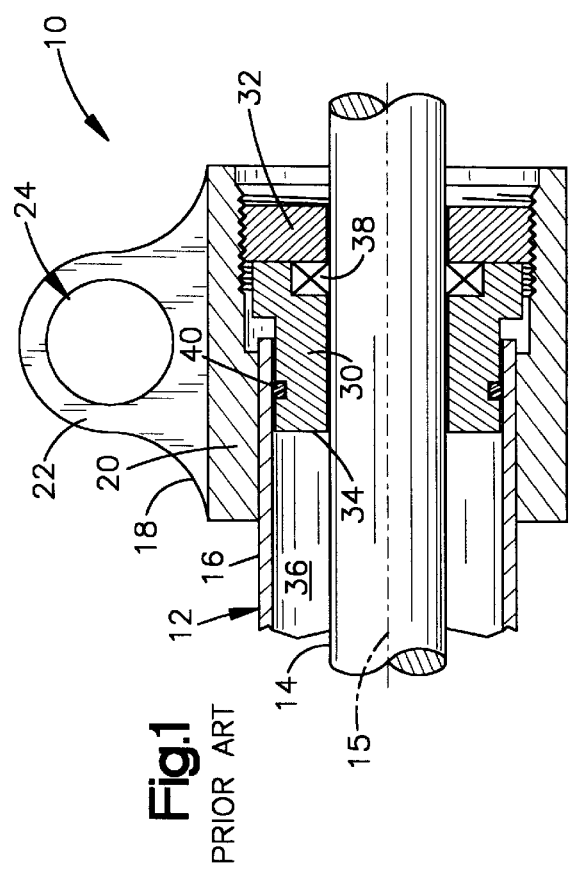
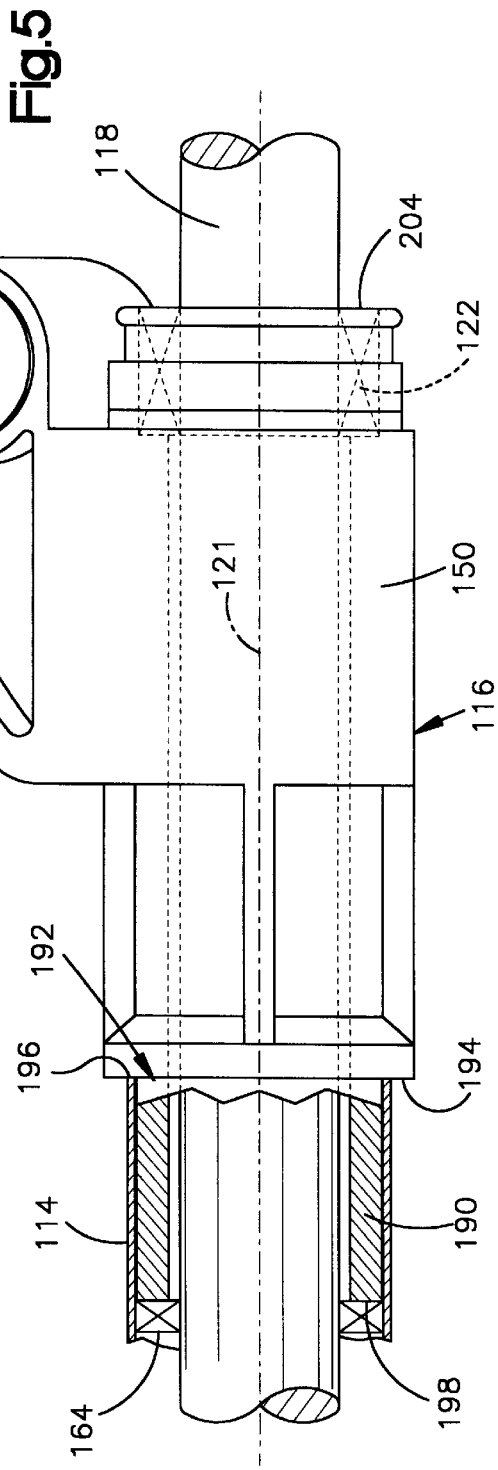

VEHICLE STEERING APPARATUS

FIELD OF THE INVENTION

The present invention relates to a hydraulically assisted rack and pinion steering gear, and particularly relates to a housing for the steering gear.

BACKGROUND OF THE INVENTION

A hydraulically-assisted rack and pinion steering gear includes a steering rack, a pinion gear in mesh with the rack, and a hydraulic fluid control valve. The rack is movable longitudinally, and is connected at its opposite ends to a vehicle steering linkage. When the rack moves, it actuates the steering linkage to effect steering movement of an associated pair of steerable vehicle wheels.

Such a steering gear includes a housing which contains the rack, the pinion gear, and the valve. The rack extends through a horizontal section of the housing. The valve is contained in a tower section of the housing which projects upward from the horizontal section.

The horizontal section of the housing includes a hydraulic fluid power cylinder. A piston in the power cylinder is fixed to the rack. The valve cooperates with the pinion gear to control the hydraulic fluid pressure in the power cylinder in response to steering input from an operator of the vehicle. This causes the piston, and hence the rack, to move in response to the steering input so that the vehicle wheels are steered accordingly.

An example of a prior art steering gear is shown partially in FIG. 1. The steering gear 10 of FIG. 1 has a horizontal housing section 12 in which a steering rack 14 is supported for movement back and forth along a longitudinal axis 15. The horizontal housing section 12 is defined in part by a hydraulic fluid power cylinder 16, and in part by a mounting structure 18. The rack 14 projects longitudinally outward from the horizontal housing section 12 in a direction extending from left to right, as viewed in FIG. 1. An outer end portion (not shown) of the rack 14 is connectable with a vehicle steering linkage in a known manner.

A cylindrical body portion 20 of the mounting structure 18 is received over the power cylinder 16 in an interference fit with the power cylinder 16. A radially-projecting bracket portion 22 of the mounting structure 18 defines a bore 24. The bore 24 receives a bushing which, in turn, receives a fastener structure that fastens the steering gear 10 to a load-bearing structural part of a vehicle.

Other parts of the steering gear 10 that are shown in FIG. 1 include a seal carrier 30 and a lock ring 32. The seal carrier 30 is an annular structure extending into the power cylinder 16 concentrically between the rack 14 and the power cylinder 16. An inner end surface 34 of the seal carrier 30 defines an outer end of a variable volume hydraulic fluid chamber 36. An annular hydraulic fluid seal 38 (shown schematically) is supported on the seal carrier 30 in dynamic sealing contact with the rack 14. An O-ring seal 40 is supported by the seal carrier 30 in static sealing contact with the power cylinder 16. The lock ring 32 is received concentrically over the rack 14 in screw-threaded engagement with the body portion 20 of the mounting structure 18. The seals 38 and 40 are thus retained in their installed positions at the end of the power cylinder 16 by the seal carrier 30, the lock ring 32 and the mounting structure 18.

SUMMARY OF THE INVENTION

In accordance with the present invention, a steering gear housing part has a tubular portion with an annular inner end surface. The housing part is constructed with reference to a corresponding hydraulic fluid power cylinder so as to be receivable in an installed position in which the tubular portion extends inward through an open end of the power cylinder in an interference fit with the power cylinder. When the housing part is in its installed position, the inner end surface of the tubular portion abuts an annular hydraulic fluid seal in the power cylinder. The tubular portion of the housing part thus blocks movement of the seal in a direction extending outward through the open end of the power cylinder when the housing part is in its installed position.

In a preferred embodiment of the present invention, the housing part further has a mounting portion which is shaped to engage a fastener structure that fastens the housing part to a vehicle. The tubular portion and the mounting portion of the housing part both are defined by a one-piece structure which is made from a single homogenous material.

BRIEF DESCRIPTION OF THE DRAWINGS

Further features of the present invention will become apparent to those skilled in the art to which the present invention relates from reading the following description with reference to the accompanying drawings, in which:

FIG. 1 is a partial view of a prior art steering gear;

FIG. 5 also is an enlarged partial view of the steering gear shown in FIG. 2.

DESCRIPTION OF A PREFERRED EMBODIMENT

Figure 2:
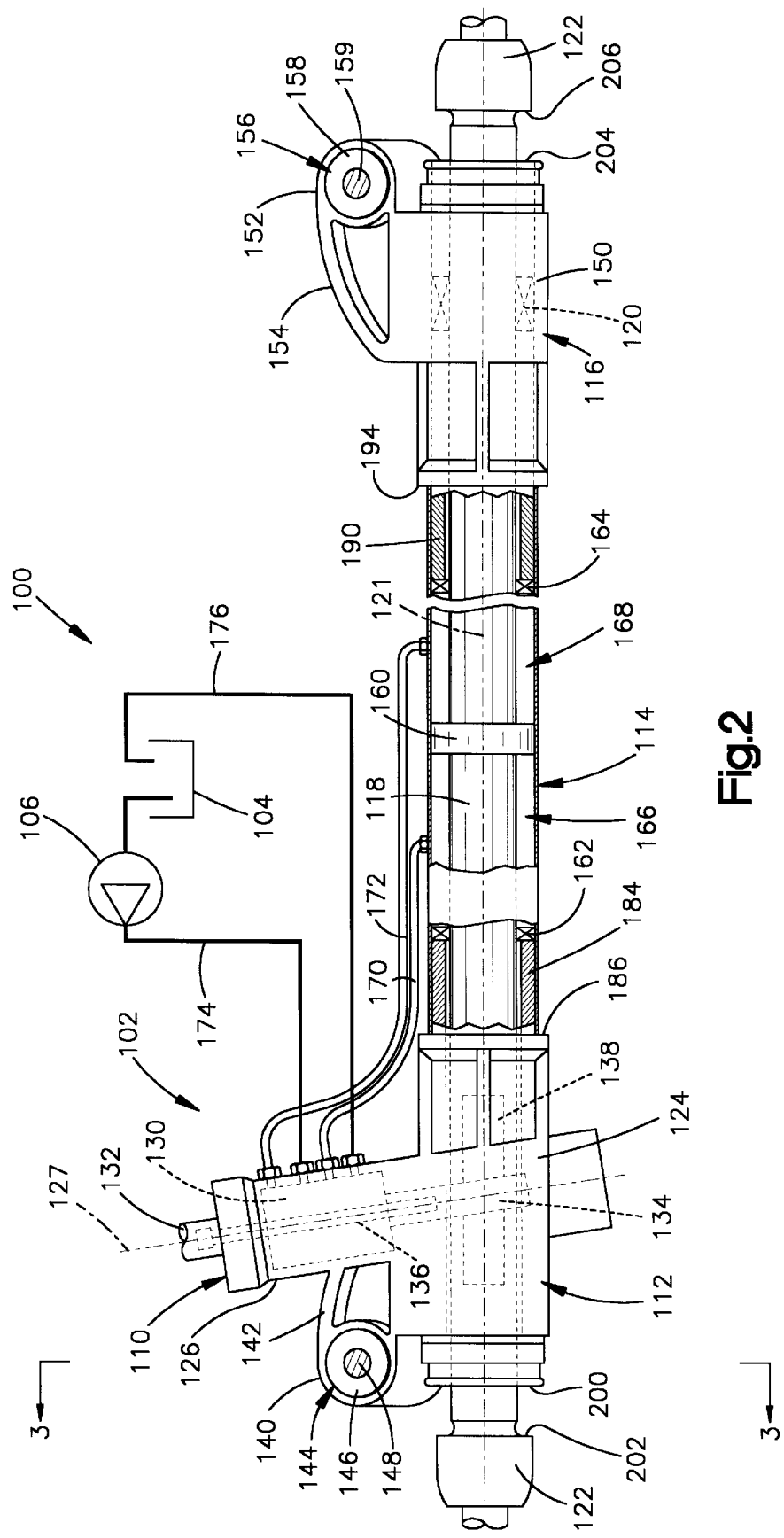
FIG. 2 is a partly schematic view of a vehicle steering system including a steering gear comprising a preferred embodiment of the present invention.
Figure 3:
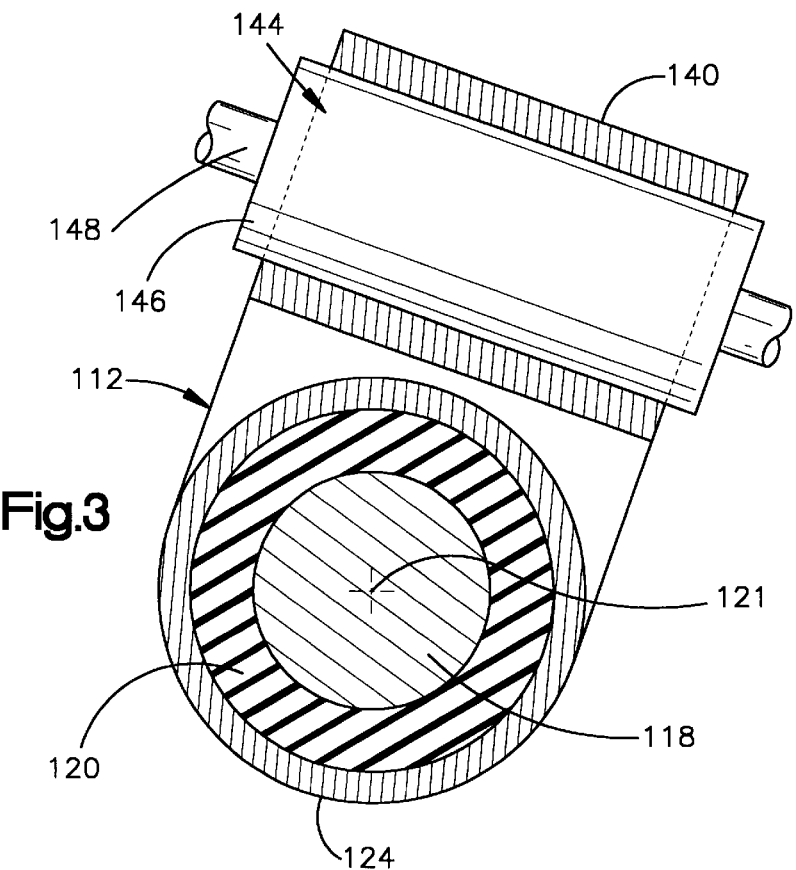
FIG. 3 is a view taken on line 3—3 of FIG. 2.

A vehicle steering system 100 is shown in FIG. 2. The steering system 100 includes a hydraulically-assisted rack and pinion steering gear 102 comprising a preferred embodiment of the present invention. The steering system 100 further includes a hydraulic fluid reservoir 104 and a pump 106 for pumping hydraulic fluid from the reservoir 104 to the steering gear 102.

The steering gear 102 includes a housing 110 with three major parts 112, 114 and 116. A steering rack 118 extends fully through the three parts 112, 114 and 116 of the housing 110. A bushing 120 (shown schematically in FIG. 2) supports the rack 118 in the housing 110 for longitudinal movement back and forth along a horizontal axis 121. A pair of ball joints 122 connect the rack 118 at its opposite ends to a vehicle steering linkage (not shown) which, in turn, connects the steering gear 102 to a pair of steerable vehicle wheels.

The first housing part 112 is a one-piece structure. By "one-piece" it is meant that the first housing part 112 is made from a single homogenous material, and is a single unit exclusive of separate but joined elements. Preferably, the single homogenous material is a material comprised at least substantially of aluminum, i.e., aluminum or an aluminum alloy. A base portion 124 of the first housing part 112 has a generally cylindrical configuration centered on the axis 121. A tower portion 126 of the first housing part 112 projects upward from the base portion 124, and is centered on a corresponding axis 127.

A hydraulic fluid control valve 130 is contained in the tower 126. An input shaft 132 projects from the tower 126 along the axis 127. The input shaft 132 is connected with the vehicle steering wheel (not shown) in a known manner, and is rotatable about the axis 127 in response to rotation of the steering wheel. A pinion gear 134 is connected with the input shaft 132 by a torsion bar 136. The pinion gear 134 is rotatable about the axis 127 in mesh with a row of rack teeth 138 on the rack 118.

A mounting portion 140 of the first housing part 112 projects from the base portion 124, and is supported by an arm 142 extending from the tower 126 to the mounting portion 140. The mounting portion 140 has a cylindrical shape defining a bore 144 (FIG. 2). The bore 144 receives a fastener structure that fastens the steering gear 102 to a load-bearing structural part of the vehicle. Such a fastener structure may comprise, for example, a bushing 146 and a fastener shank 148, each of which may have any suitable configuration known in the art.

The third housing part 116 also is a one-piece structure made from a single homogenous material comprised at least substantially of aluminum. A base portion 150 of the third housing part 116 has a generally cylindrical configuration centered on the axis 121. A mounting portion 152 of the third housing part 116 projects from the base portion 150, and is supported by an arm 154 extending from the base portion 150 to the mounting portion 152. Like the mounting portion 140 of the first housing part 112, the mounting portion 152 of the third housing part 116 has a cylindrical shape defining a bore 156 for receiving a fastener structure, such as a bushing 158 and a fastener shank 159, for fastening the steering gear 102 to the vehicle in a known manner.

The second housing part 114 is a hydraulic fluid power cylinder in the form of a steel tube. The tube 114 is centered on the axis 121, and extends axially between the first and third housing parts 112 and 116. A piston 160 is fixed to the rack 118 within the tube 114. A pair of annular hydraulic fluid seals 162 and 164 (shown schematically) are contained in the tube 114 on opposite sides of the piston 160. A first variable volume hydraulic fluid chamber 166 extends axially between the piston 160 and the first seal 162. A second variable volume hydraulic fluid chamber 168 extends axially between the piston 160 and the second seal 164. Each of the seals 162 and 164, as well as the piston 160, may comprise any suitable structure known in the art.

The valve 130 communicates with the first chamber 166 through a first two-way conduit 170. The valve 130 communicates with the second chamber 168 through a second two-way conduit 172. As shown schematically in FIG. 2, the valve 130 receives hydraulic fluid from the pump 106 through an inlet conduit 174. An outlet conduit 176 exhausts hydraulic fluid from the valve 130 to the reservoir 104. The valve 130 cooperates with the pinion gear 134 to vary the hydraulic fluid pressure in the first and second chambers 166 and 168 in response to rotation of the input shaft 132. This provides hydraulic fluid power which assists movement of the piston 160 and the rack 118 along the axis 121 and thereby assists steering movement of the vehicle wheels in amounts and directions corresponding to rotation of the vehicle steering wheel.

Figure 4:
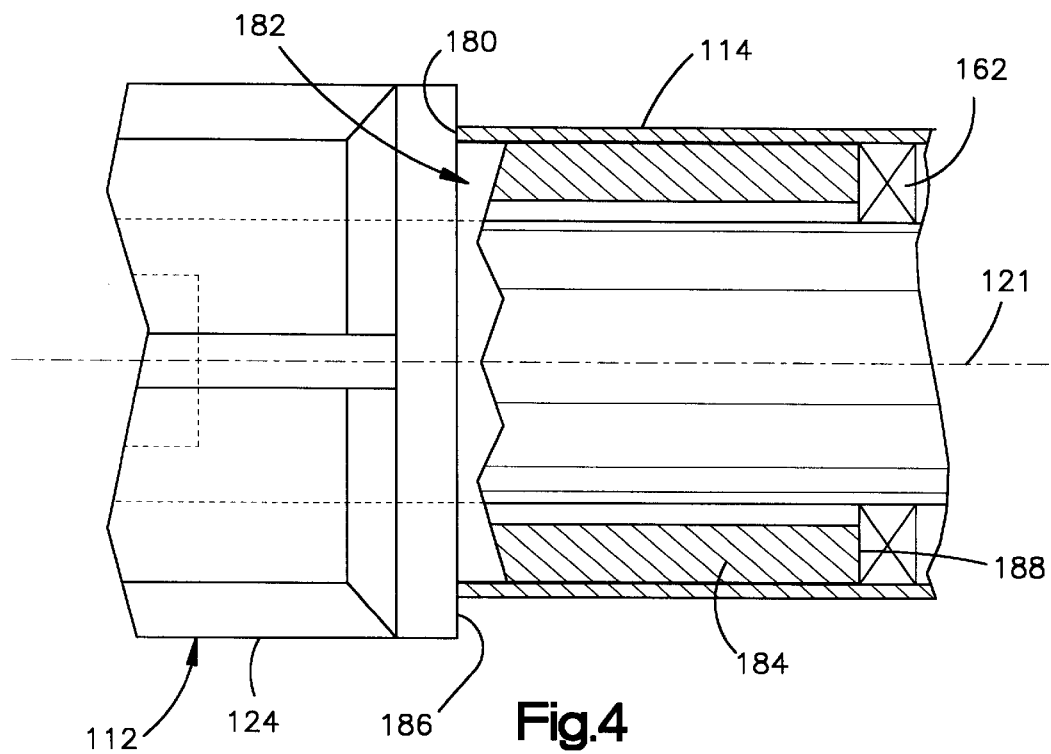
FIG. 4 is an enlarged partial view of the steering gear shown in FIG. 2.

The first housing part 112 and the tube 114 are joined together in the arrangement shown in enlarged detail in FIG. 4. The tube 114 has an annular end surface 180 defining a first open end 182 of the tube 114. The first housing part 112 has a reduced-diameter tubular portion 184 projecting axially from the base portion 124 into the tube 114. Specifically, the tubular portion 184 of the first housing part 112 extends axially inward through the first open end 182 of the tube 114, and has an interference fit with the tube 114. The interference fit is preferably continuous fully along the length and around the circumference of the tubular portion 184 within the tube 114.

An annular stop surface 186 on the base portion 124 of the first housing part 112 projects radially outward from the outer end of the tubular portion 184. The stop surface 186 abuts the end surface 180 of the tube 114 circumferentially entirely around the axis 121. An annular inner end surface 188 of the tubular portion 184 abuts the first seal 162 circumferentially entirely around the axis 121. The first housing part 112 is thus engaged with the tube 114 in an installed position in which the tubular portion 184 blocks movement of the first seal 162 in a direction extending outward through the first open end 182 of the tube 114.

The interference fit and the abutment with the seal 162 enable the tubular portion 184 of the first housing part 112 exclusively to block outward movement of the seal 162 so that other parts such as, for example a seal carrier and/or a locking ring, are not required to help retain the seal 162 in place. This arrangement is preferably achieved by i) orienting the first housing part 112 vertically, ii) placing the seal 162 concentrically upon the end surface 188 of the tubular portion 184, and iii) sliding the tube 114 forcefully downward over the seal 162 and the tubular portion 184 until the end surface 180 of the tube 114 moves into abutment with the stop surface 186.

As shown in FIG. 5, the third housing part 116 and the tube 114 are joined together in an arrangement substantially similar to that shown in FIG. 4. An elongated tubular portion 190 of the third housing part 116 extends axially inward through a second open end 192 of the tube 114 in an interference fit which is preferably continuous throughout the length and circumference of the tubular portion 190 within the tube 114. An annular stop surface 194 on the base 150 of the third housing part 116 abuts an opposed annular end surface 196 of the tube 114 circumferentially entirely around the axis 121. An annular inner end surface 198 of the tubular portion 190 abuts the second seal 164 circumferentially entirely around the axis 121. The tubular portion 190 of the third housing part 116 thus blocks movement of the second seal 164 in a direction extending outward through the second open end 192 of the tube 114 in the same manner as described above with reference to the parts shown in FIG. 4. This arrangement also is preferably achieved by sliding the tube 114 vertically downward over the other parts 164 and 190.

In accordance with a particular feature of the present invention, the base portion 124 of the first housing part 112 has an annular stop surface 200 (FIG. 2) facing axially toward an opposed annular surface 202 on the adjacent ball joint 122. The first housing part 112 limits movement of the rack 118 from left to right, as viewed in FIG. 2, upon movement of the opposed surface 202 into abutment with the stop surface 200. An annular stop surface 204 on the third housing part 116 similarly faces axially toward an opposed annular surface 206 on the other ball joint 122 at the opposite end of the rack 118. These parts of the steering gear 102 would be covered by boot seals in a known manner when the steering gear 102 is installed in a vehicle. However, such boot seals are omitted from the drawings for clarity of illustration.

In accordance with another particular feature of the invention, the third housing part 116 supports the bushing 120 at a location spaced axially inward from the stop surface 204. The third housing part 116 thus performs four distinct functions, namely: blocking movement of the second seal 164, supporting the steering gear 102 on the vehicle by use of the mounting portion 152, limiting movement of the rack 118 upon movement of the adjacent ball joint 122 against the stop surface 204, and supporting the bushing 120 which, in turn, supports the rack 118.

From the above description of the invention, those skilled in the art will perceive improvements, changes and modifications. Such improvements, changes and modifications within the skill of the art are intended to be covered by the appended claims.

Having described the invention, the following is claimed:

1. A vehicle steering apparatus comprising:

a steering gear housing part having a tubular portion with an annular inner end surface;

said housing part being constructed with reference to a corresponding hydraulic fluid power cylinder so as to be receivable in an installed position in which said tubular portion extends inward through an open end of the power cylinder in an interference fit with the power cylinder, and in which said inner end surface of said tubular portion abuts an annular hydraulic fluid seal in the power cylinder, whereby said tubular portion of said housing part blocks movement of the seal in a direction extending outward through the open end of the power cylinder, said housing part further having a mounting portion shaped to engage a fastener structure that fastens said housing part to a vehicle, said housing part further having an arm extending from said housing part and connected to said mounting portion, said mounting portion being attached to said housing part by a structure separate and apart from said arm.

2. An apparatus as defined in claim 1 wherein said housing part has an annular stop surface projecting radially from an outer end of said tubular portion, said stop surface abutting an end surface of the power cylinder when said housing part is in said installed position, whereby said tubular portion is fully received in the power cylinder when said housing part is in said installed position.

3. An apparatus as defined in claim 1 wherein said mounting portion has a cylindrical shape defining a bore for receiving said fastener structure.

4. An apparatus as defined in claim 3 wherein said housing part is a one-piece structure.

5. An apparatus as defined in claim 4 wherein said housing part further has a tower portion comprising means for containing a hydraulic fluid control valve.

6. An apparatus as defined in claim 5 wherein said housing part is comprised at least substantially of aluminum.

* * * * *